US006787069B1

United States Patent
Kohiki et al.

(10) Patent No.: US 6,787,069 B1
(45) Date of Patent: Sep. 7, 2004

(54) COMPOUND HAVING DOPANT INTRODUCED INTO VACANT LATTICE POINT WHILE CONTROLLING POSITION AND CONCENTRATION

(75) Inventors: Shigemi Kohiki, Kitakyusyu (JP); Ryuta Kiyoshima, Isahaya (JP); Shigenori Matsushima, Kitakyusyu (JP); Masakuni Sasaki, Kitakyusyu (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 09/937,149

(22) PCT Filed: Mar. 27, 2000

(86) PCT No.: PCT/JP00/01866

§ 371 (c)(1),
(2), (4) Date: Sep. 21, 2001

(87) PCT Pub. No.: WO00/66496

PCT Pub. Date: Nov. 9, 2000

(30) Foreign Application Priority Data

Apr. 30, 1999 (JP) ............................................ 11-123829

(51) Int. Cl.$^7$ ........................ C01G 15/00; C01D 15/62; H01B 1/08
(52) U.S. Cl. ................................ 252/518.1; 252/519.1; 252/301.4; 423/624; 423/641
(58) Field of Search ......................... 252/518.1, 519.1, 252/301.4, 519.5, 520.2, 521.2; 423/624, 641, 594.14, 622, 574.45

(56) References Cited

PUBLICATIONS

Kohiki et al, "Enhanced Conductivity of Zinc Oxide thin films by ion implantation of hydrogen atoms", Appl. Phys. Lett. 1994, vol. 64, pp 2876–2878.*
Walle, "Hydrogen as a cause of Doping in Zinc Oxide", Physical Review Letters, 2000, vol. 85(5), pp 1012–1015.*
Ryuta et al, "Preparation and characterization of In2O3:Lix(x =0–1.0)", Nippon Kagaku Kaishi 1999, vol. 5, pp 323–327.*
Sasaki et al, "Preparation and characterization of Lithium doped Indium Sesqui Oxide", J. Alloys and Compounds, 2001, 322, p 220–225.*
M. Marezio, "Refinement of the Crystal Structure of In2O3 at two Wavelengths", Acta Crystallogr., 20, 723 (1966).
R. L. Weiher et al., "Optical Properties of Indium Oxide", Journal of Applied Physics, vol. 37, No. 1, Jan. 1966, pp. 299–302.

* cited by examiner

Primary Examiner—Mark Kopec
Assistant Examiner—Kallambella Vijayakumar
(74) Attorney, Agent, or Firm—Sherman & Shalloway

(57) ABSTRACT

A compound obtained by incorporating atoms Cz into vacant lattice points of a crystal represented by the general formula $A_xB_y$ (wherein A is a cation; B is an anion; and x and y satisfy an electrically neutral stoichiometric ratio) while controlling the introduction with respect to position and/or concentration (C is an atom capable of forming an ion which has an arbitrary valence and is introduced into a vacant lattice point of the crystal of the compound $A_xB_y$; and z is from 0 to the number corresponding to the concentration of vacant lattice points in $A_xB_y$).

1 Claim, 18 Drawing Sheets

COMPOUND HAVING DOPANT INTRODUCED INTO VACANT LATTICE POINT WHILE CONTROLLING POSITION AND CONCENTRATION

FIELD OF THE INVENTION

The present invention relates to a compound whose electric, optical or semiconductive characteristics or combined characteristics are modified by introducing an atom C into vacant lattice points of a crystal represented by the general formula $A_xB_y$ (wherein A is cation and B is anion) while controlling position and/or concentration, concretely, relates to a compound whose dependency of electric resistance ratio to the electric field intensity and the magnetic characteristic are improved by introducing an alkali metal element such as Li or a transition metal element such as Cu which forms a shallow level or a deep level as a dopant into vacant lattice of $In_2O_3$ crystal which is $Sc_2O_3$ type translational symmetric crystalline lattice structure, or a compound whose electric conductivity ratio is improved by introducing H into vacant point of ZnO which is hexagonal wurtzite type crystalline structure.

In this specification, the term of vacant lattice point does not indicate a random lattice defect observed in a periodical lattice, namely, a lattice defect which means that there is no atom at the point where there is an atom at the ordinary condition, but indicates the group of crystals which has periodic lattice unit including vacant lattice point satisfying the translational symmetricity. That is, the term of vacant lattice point indicates a lattice point which is originally constitute unit cell but absent of atom (vacant) and satisfy the translational symmetricity, to which a introducing atom introduced so as to fill a vacant lattice point and constitute scandium oxide structure periodicity. And in the present invention, the introduction of atom C is called as a vacant lattice filling type introducing.

BACKGROUND OF THE INVENTION

In general, a crystalline compound represented by a stoichiometric ratio $A_xB_y$, for instance $In_2O_3$ crystalline compound is an insulator having broad band gap. The technique to improve the electric conductivity of said crystalline compound to the level of metal by introducing an atom which substitute trivalence In and becomes quaternary valence (so called donor type atom) atom such as Sn is proposed.

A thin film of $In_2O_3$ has high transmissibility to the visible rays and has a specific feature to reflect the ray of wave length from near infra red to infra red, therefore, based on said specific feature, it is used as a transparent electrode of a liquid crystal display or a thin film solar battery.

However, the endowment of specific feature by said introducing is considered to be caused by $Sn^{4+}$ which is substituted and solid solved at an $In^{3+}$ sub lattice point or an oxide vacant hole acts as a donor, however, is not made clear yet theoretically in detail. Therefore, the theoretical clarification for reappearance or stability of it is very difficult. This difficulty is originated from the fact that, for example, the crystalline structure of $In_2O_3$ crystal is complicated (a structure as shown in FIG. 9(b), eight octants of (I)–(III) are arranging, and (a) shows a case that three units are arranging), and further originated by the fact that the numbers of atom contained in an unit structure is so many, therefore these atoms are becoming to be related with introducing.

Accordingly, for designing of the substance, the inventors of the present invention have reached to the conclusion that the development of a method to obtain a compound having a desired feature by introducing an atom or ion into crystal structure of a crystalline compound of above mentioned stoichiometric ratio formation with good reproductivity and stability by controlling position and/or concentration is very important. For example, the development of a method to introduce monovalence or divalence ions such as $Li^+$ or $Cu^{2+}$ into $In_2O_3$ crystal is very important.

Therefore, the object of the present invention is to provide a compound prepared by introducing an atom or an ion of said atom into a crystal whose stoichiometric ratio formation is represented by the general formula of $A_xB_y$ (wherein, A is cation and B is anion) by controlling position and/or concentration. In the other words, the object of the present invention is to develop a method to introduce an atom or an ion of said atom into a crystal whose stoichiometric ratio formation is represented by the general formula of $A_xB_y$ by controlling position and/or concentration.

The inventors of the present invention, have accomplished the present invention by dissolving the above-mentioned problems. That is, the vacant lattice points can be illustrated as follows. For example, $In_2O_3$ possessing $Sc_2O_3$ type crystalline lattice structure possesses originally lattice points of 8a, 8b, 16b, 24d and 48e indicated by Wyckoff indication, and among these lattice points, the lattice points occupied by an atom are 8b, 24d (both are In) and 48e (oxygen), while, the lattice points of 8a and 16c are not occupied by atom (vacant lattice point). In the structure of lattice which satisfies stoichiometric ratio formation and translational symmtricity, the lattice point which is not originally occupied by an atom is called as a vacant lattice point. This vacant lattice point is different from the crystal lattice defect characterized as the lack of an atom at the point where an atom exists (this is an introductional subject which can not realize the stoichiometric ratio formation). By establishing a method to introduce an atom to said vacant lattice point, the present invention is accomplished. For example, the compound which has desired characteristics can be designed by introducing a typical metal element Li or a transition metal element Cu to $In_2O_3$ crystal so as to provide varistor characteristic or magnetic characteristic based on a transition metal or by selection an atom to be introduced. Further, the example to improve the electron conductivity by introducing hydrogen atom to the vacant lattice point of ZnO can be mentioned. When an atom having radius r is introduced to the vacant lattice point of various crystalline compounds represented by the general formula $A_xB_y$ and forms a close-packed structure, the maximum radius of an octahedral hole or a tetrahedral hole becomes respectively 0.4 r and 0.2 r. An atom species which provides desired electronic characreristic should have atom radius within the limit restricted by geometrical condition of crystalline structure of the subjected compound. That is, when the varistor characteristic is desired, s electrons having ionic bond feature should be selected, while, when the excellent electron conductivity is desired, d electrons having covalent bond feature should be selected. The atom which can provide the desired characteristic to the various mother crystal by being introduced into the vacant lattice point of said mother crystal is selected previously, namely, the energy band electron structure when the atom is filled into vacant lattice point of the mother crystal is calculated. And the compound having desired feature which will be obtained by the actual introducing based on said calculation is designed and prepared. For the calculation of energy band electronic structure, technical skills such as the first-principle band calculation, the fight bonding approximation band calculation method or the cluster electronic structure calculation method are used at need.

The idea of this invention which obtain a compound having desired characteristic by introducing an expected atom to a vacant lattice point (vacant lattice point designed so as to generate novel characteristic) of the crystalline compound represented by above mentioned general formula is a quite new idea.

Therefore, as mentioned above, for the purpose to distinguish from the conventional substitutional type, the dopant introducing method of the present invention is named as an introducing type.

DISCLOSURE OF THE INVENTION

The present invention is a compound whose dependency of electric resistibility to the electric field intensity and the magnetic characteristic are improved by introducing an alkali metal element such as Li or an transition metal element such as Cu which forms a shallow level or a deep level as a dopant into vacant lattice of $In_2O_3$ crystal which is $Sc_2O_3$ type translational symmetric crystalline lattice, or a compound whose electric conductivity is improved by introducing H into vacant point of ZnO which is hexagonal wurtzite type crystalline structure.

BRIEF ILLUSTRATION OF DRAWINGS

FIG. 1, from (a) to (d) are the secondary electron (Scanning Electron Microscope: SEM) pictures of particles of $In_2O_3$:$Li_x$ [x=0(a), 0.2(b), 0.5(c), 1.0(d)], which indicate change of particle diameter along with the increase of amount of as Li introduction and (e) of x=0.2 indicates the state of growing of octahedron of particle. Scale of pictures are shown below each pictures.

Figure 6:
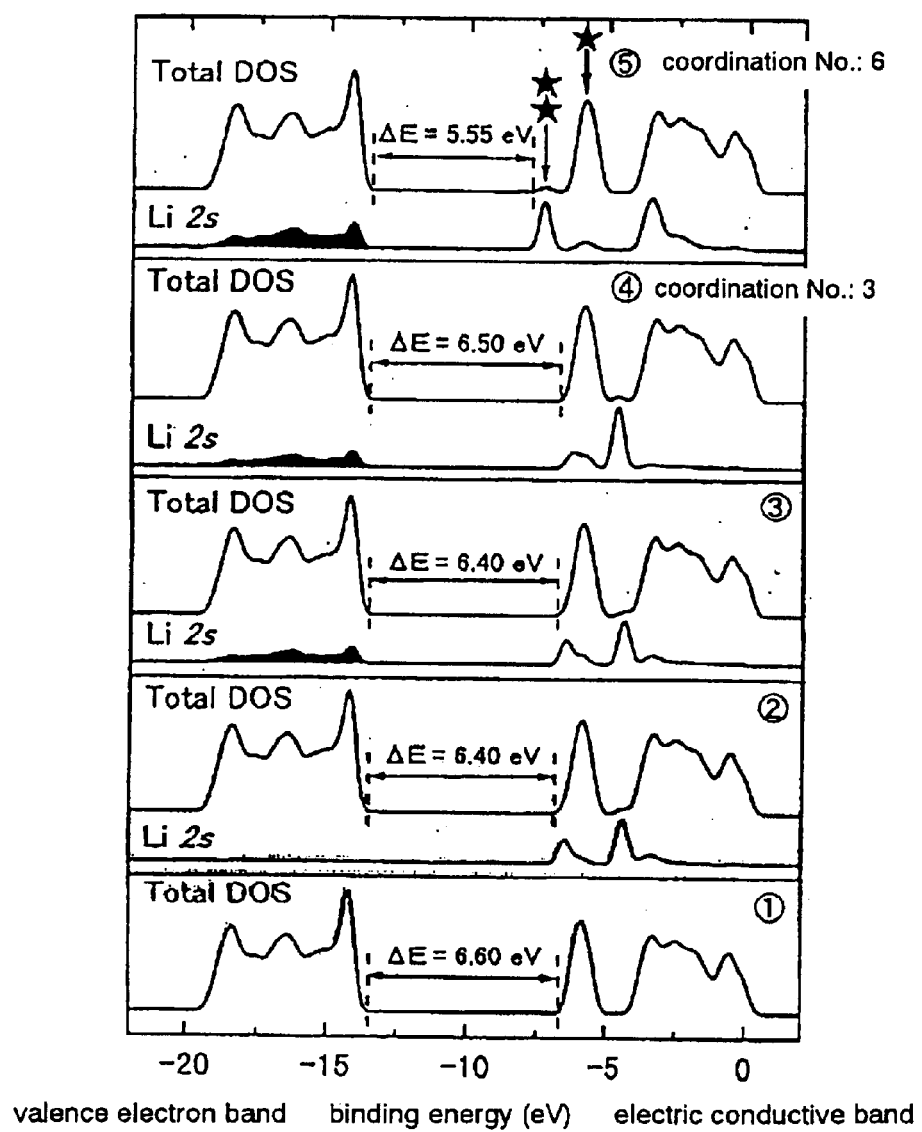

FIG. 6 shows the point of introducing type dopant in crystal and the corresponding electronic band structure. ① the total density of state (DOS) $In_2O_3$ perfect-crystal, ② is a case when one Li is introduced into one 8a point and ③ is a case when Li are introduced into two 8a point. And ④ indicates total DOS of $In_2O_3$ crystal and partial state density of Li 2s orbital of a case of 3 coordination when Li is introduced to two 16c points. Further, ⑤ indicate total DOS of $In_2O_3$ crystal and partial DOS of Li 2s orbital of a case of 6 coordination when Li is introduced into two 16c points.

Figure 7:
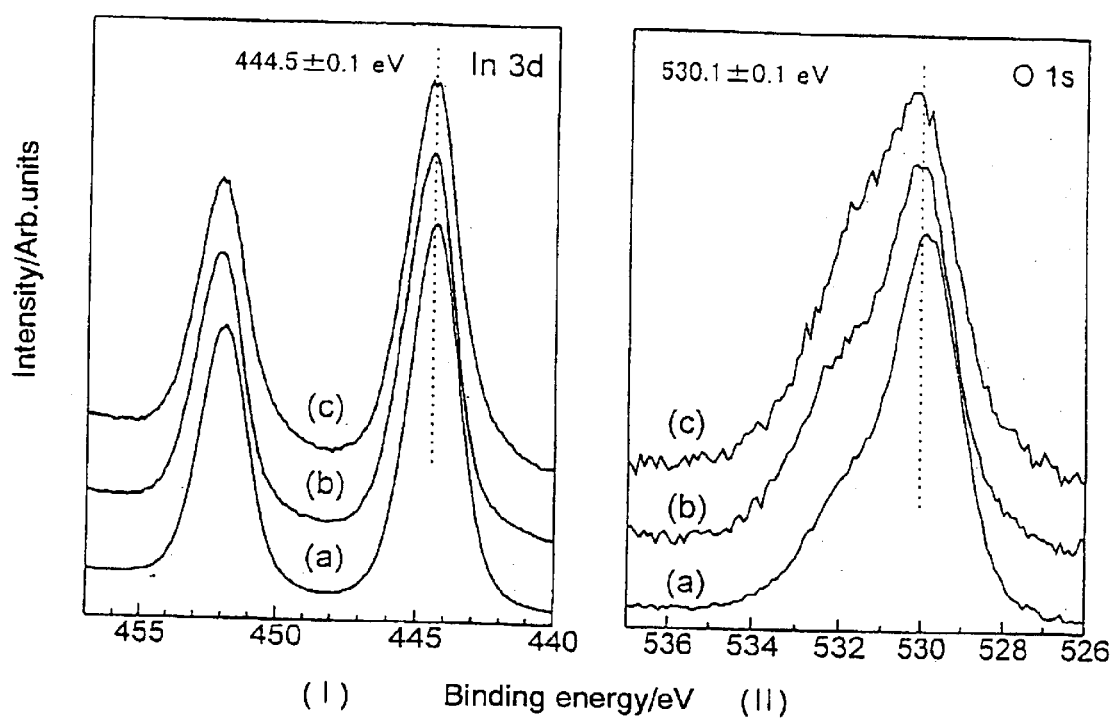

FIG. 7 shows In 3d (I), 0 1s (II) inner-shell spectra of $In_2O_3$:$Li_x$ [x=0(a), 0.2(b), 1.0(c)].

Figure 8:
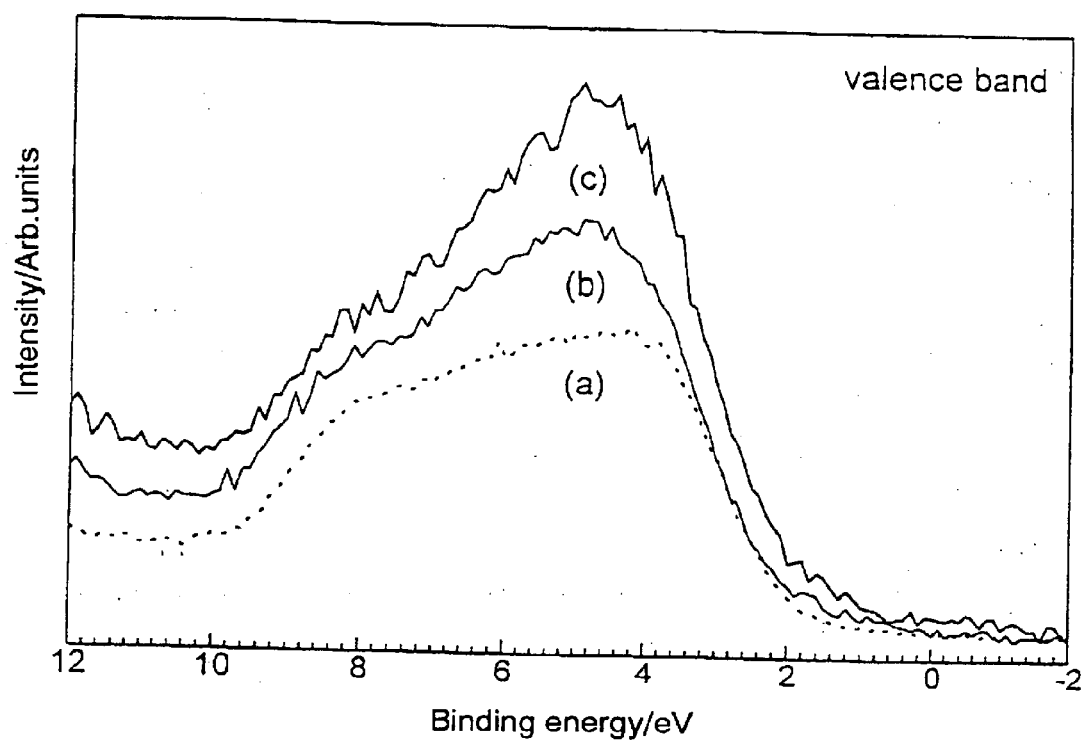

FIG. 8 shows the valence electron spectra of $In_2O_3$:$Li_x$ [x=0(a), 0.2(b), 1.0(c)].

Figure 9:
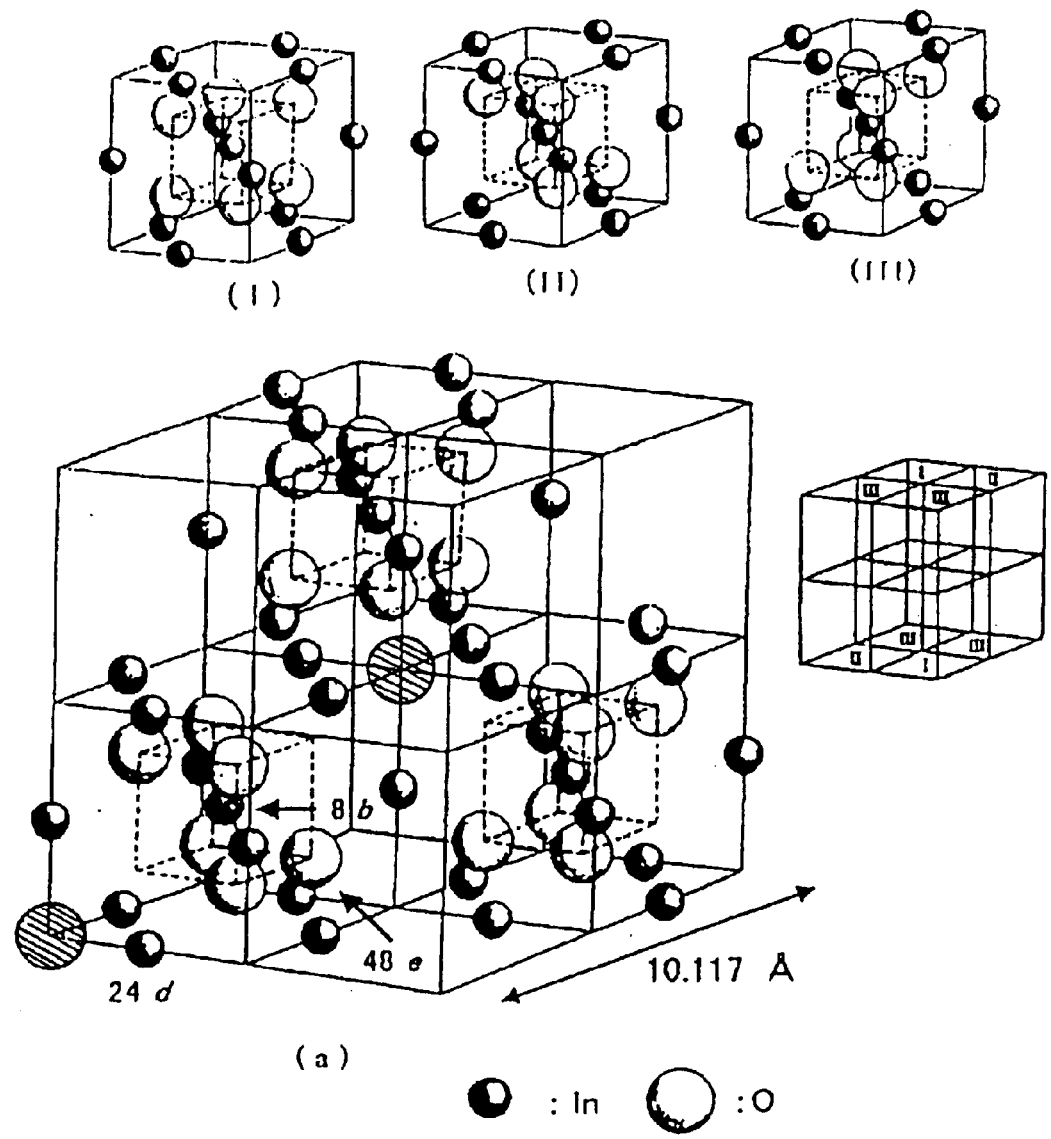

FIG. 9 shows the crystalline structure of the compound formed by the compound characterizing whose space group of $In_2O_3$ crystal is I a3 and the crystal unit lattice of C-rare earth type structure is composed of the combination of unit lattice of 8 fluorite structures that lacks of an oxide ion. From (I) to (III) are octant and (a) indicates atom alone of said 3 octants. The circular mark ○ with oblique line (with shadow) is 8a point which indicates the introduction point of an atom or an ion of said atom.

Figure 10:
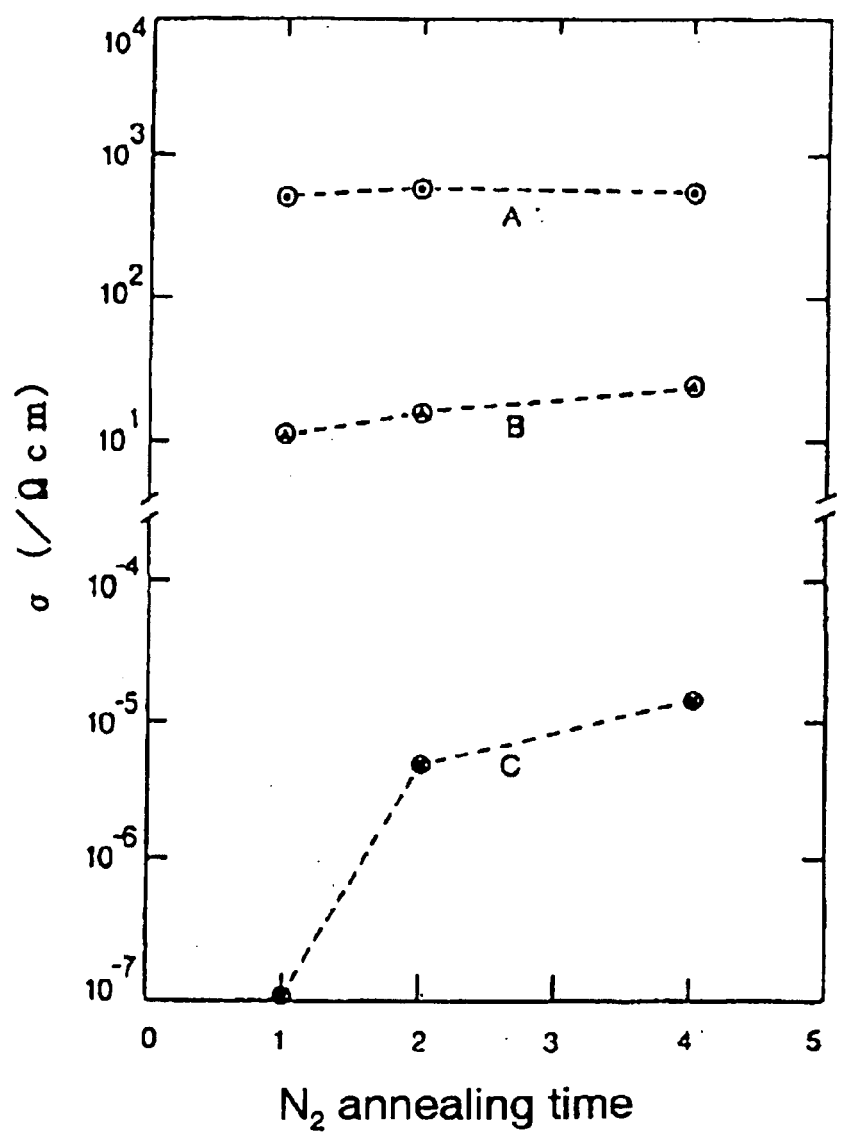

FIG. 10 indicates the relationship between electric conductivity and annealing time in $N_2$ at 200° C. of specimens whose introducing amount are different [dosing amount:, $1\times10^{17}$/$cm^2$ (A), $1\times10^{16}$/$cm^2$ (B), $1\times10^{15}$/$cm^2$ (C),].

Figure 11:
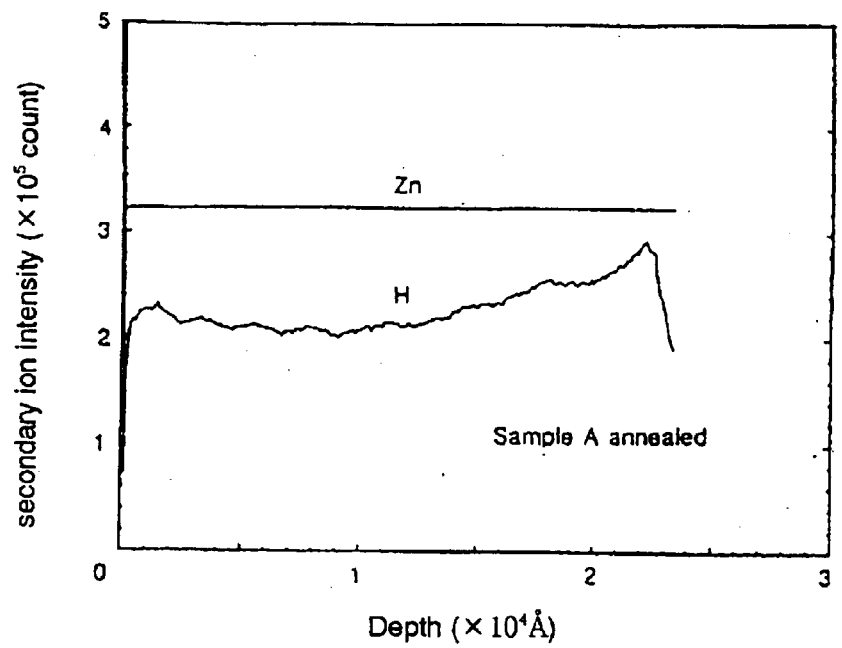

FIG. 11 shows the secondary ion quantitative analysis results of the concentration distribution to the depth direction of the maximum dose amount film after annealed for 4 hours (standarized by $^1H$:$^{87}Zn$).

Figure 12:
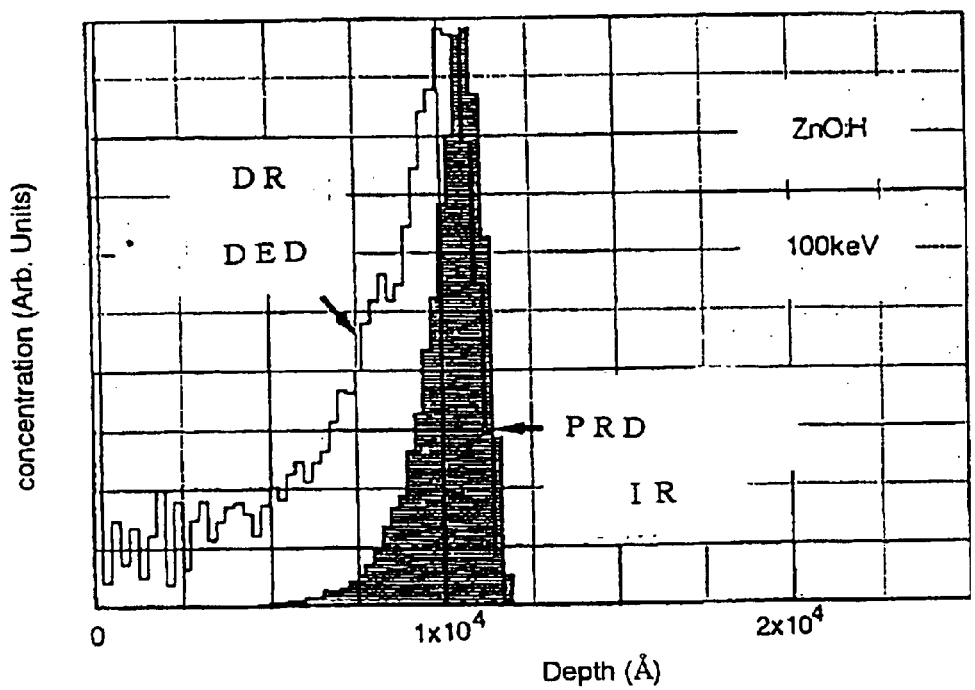

FIG. 12 shows the distribution to the depth direction of the poured hydrogen atom into ZnO film calculated by assuming random collision of particles (DR is a damaged region, DED is a distribution of damage energy, PRD is a distribution of irradiation region and IR is a pouring region).

Figure 13:
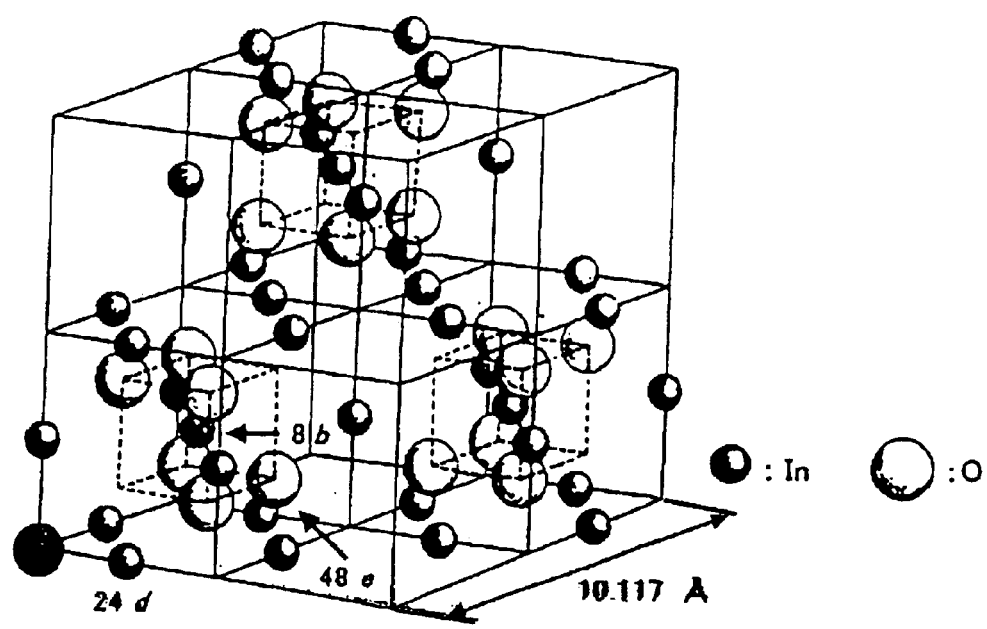

FIG. 13 shows the crystalline structure of $In_2O_3$ [most closed six oxygen atoms (Li—O 2.23 Å)] to the 8a point of which, one Li (↑) is introduced (0, 0, 0).

Figure 14:
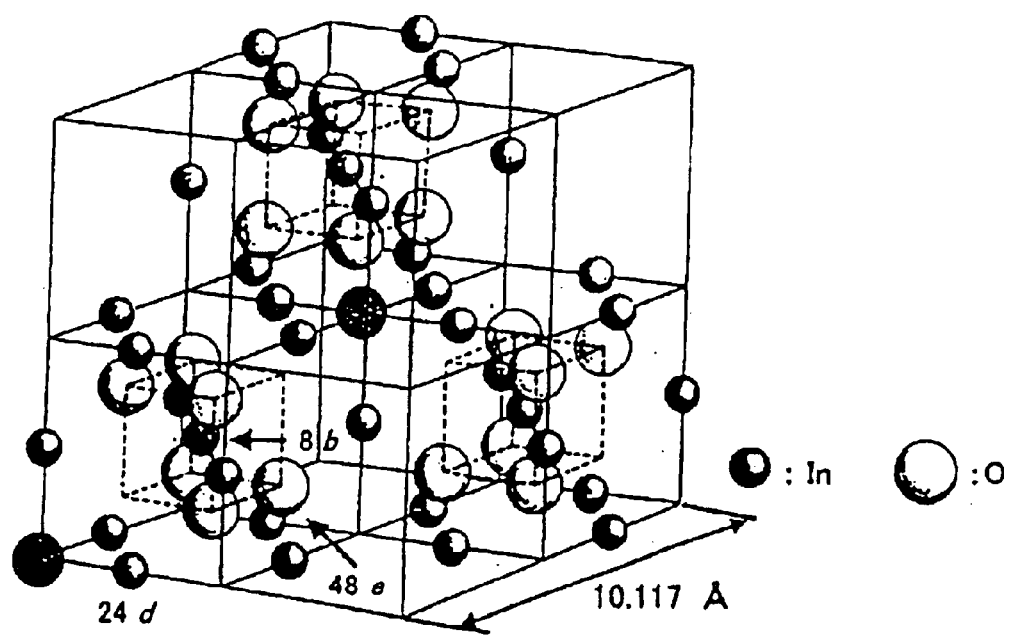

FIG. 14 shows the crystalline structure of $In_2O_3$ [most closed six oxygen atoms (Li—O 2.23 Å)] to the 8a point of which, two Li (↑) are introduced (0, 0, 0, ½, ½, ½).

Figure 15:
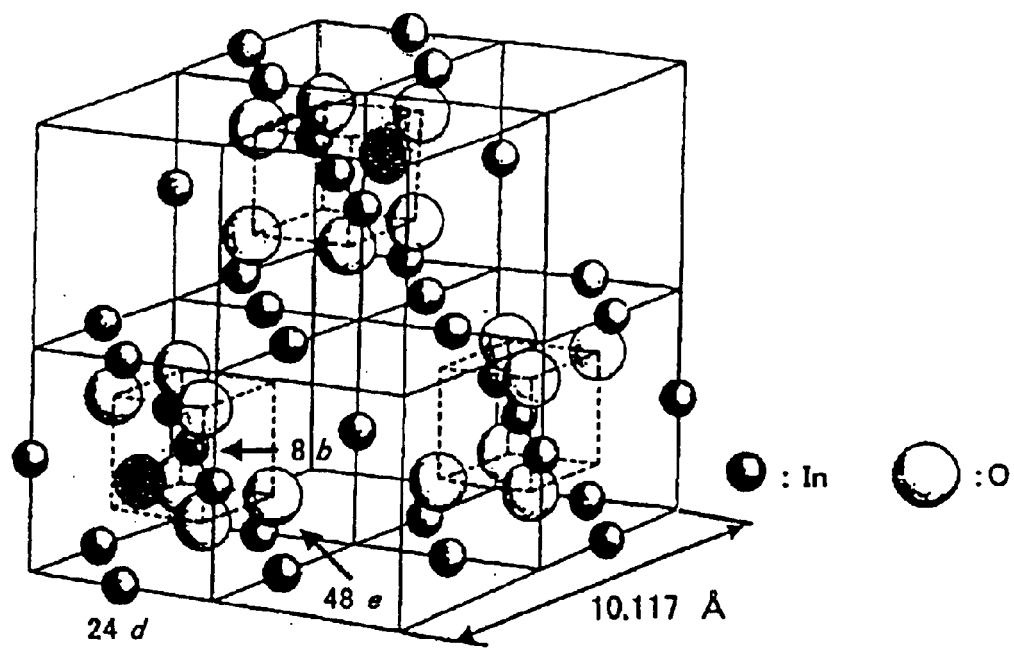

FIG. 15 shows the crystalline structure of $In_2O_3$ [most closed three Oxygen atoms (Li—O 2.07 Å), most closed three In atoms (Li—In 2.31 Å)] to the 16c point of which, two Li (↑) are introduced (x, x, x, ½+x, ½−x, x).

Figure 16:
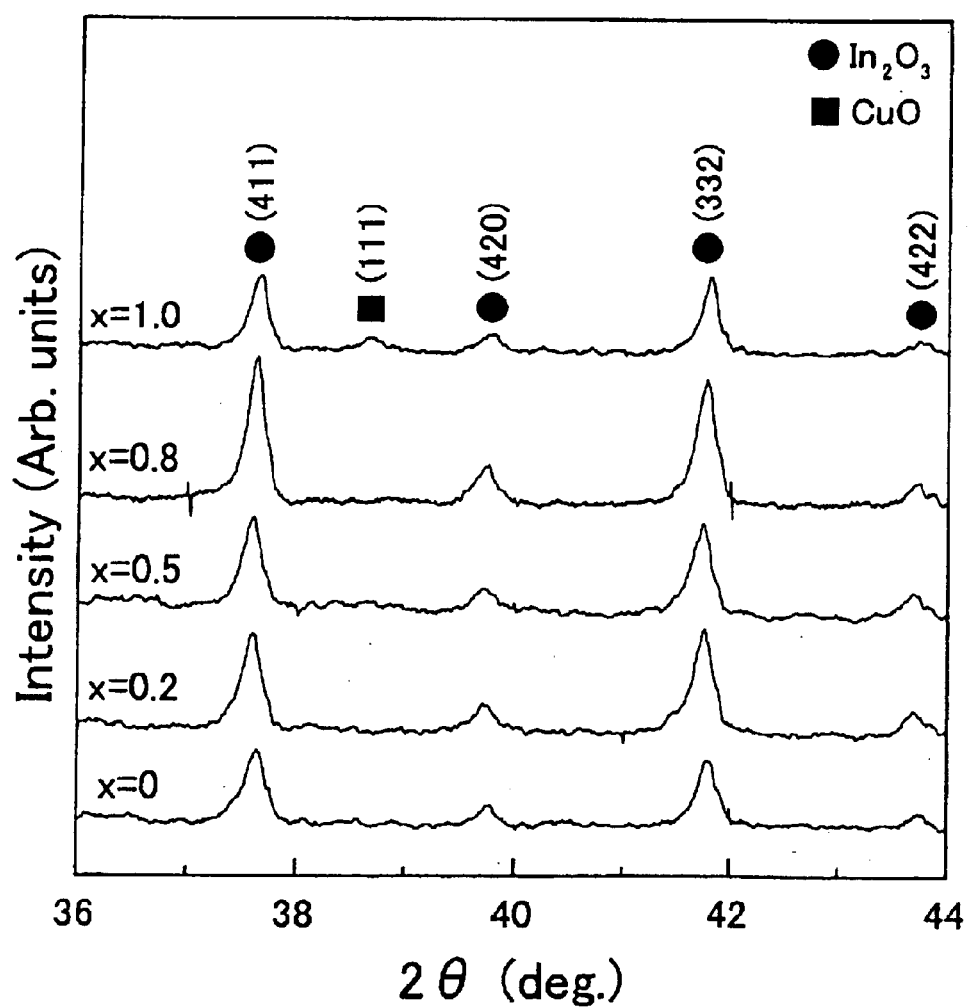

FIG. 16 indicates X ray diffraction patterns referring to $In_2O_3$:$Cu_x$ [x=0, 0.2, 0.5, 0.8, 1.0 (CuO)].

Figure 17:
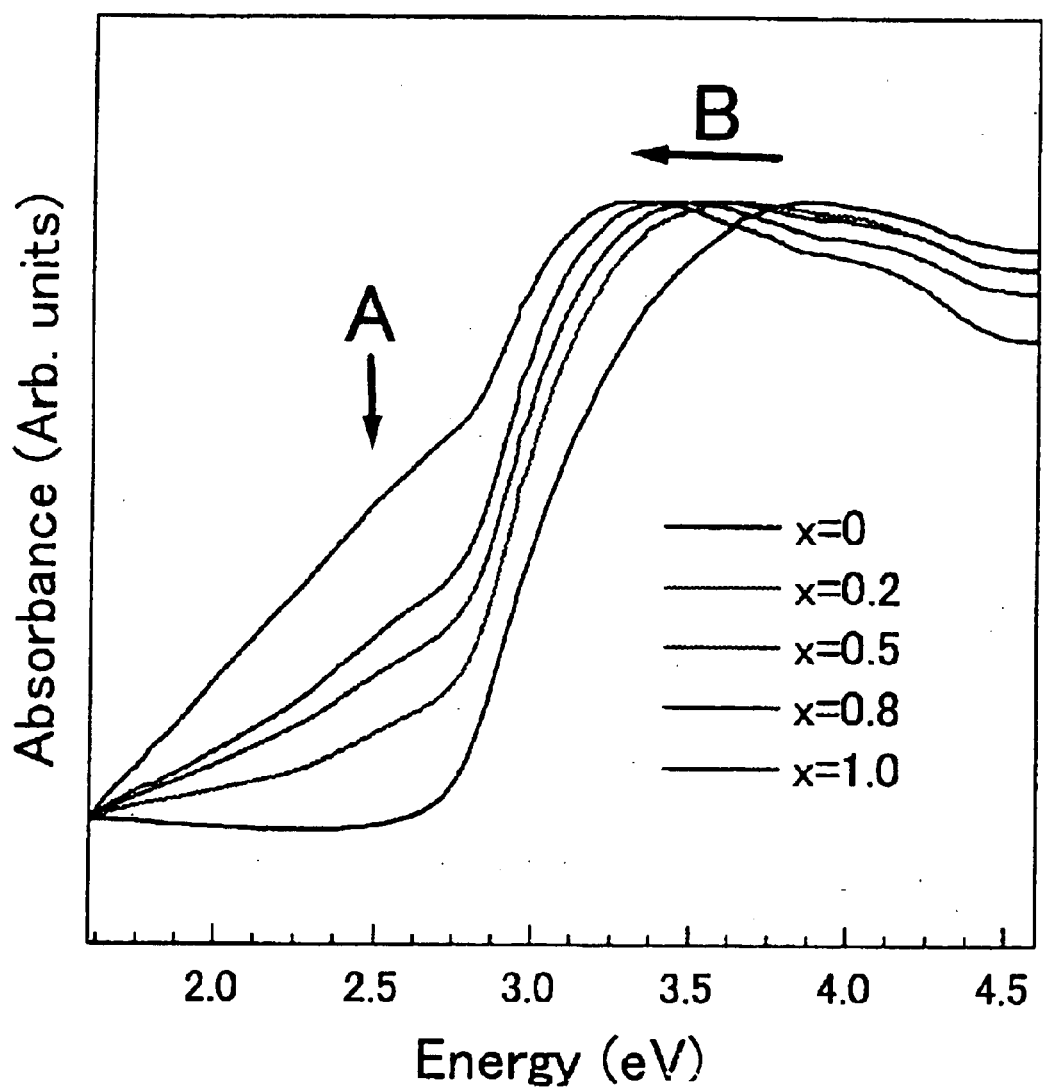

FIG. 17 indicates optical adsorption spectra referring to $In_2O_3$:$Cu_x$ [x=0, 0.2, 0.5, 0.8, 1.0 (CuO)].

Figure 18:
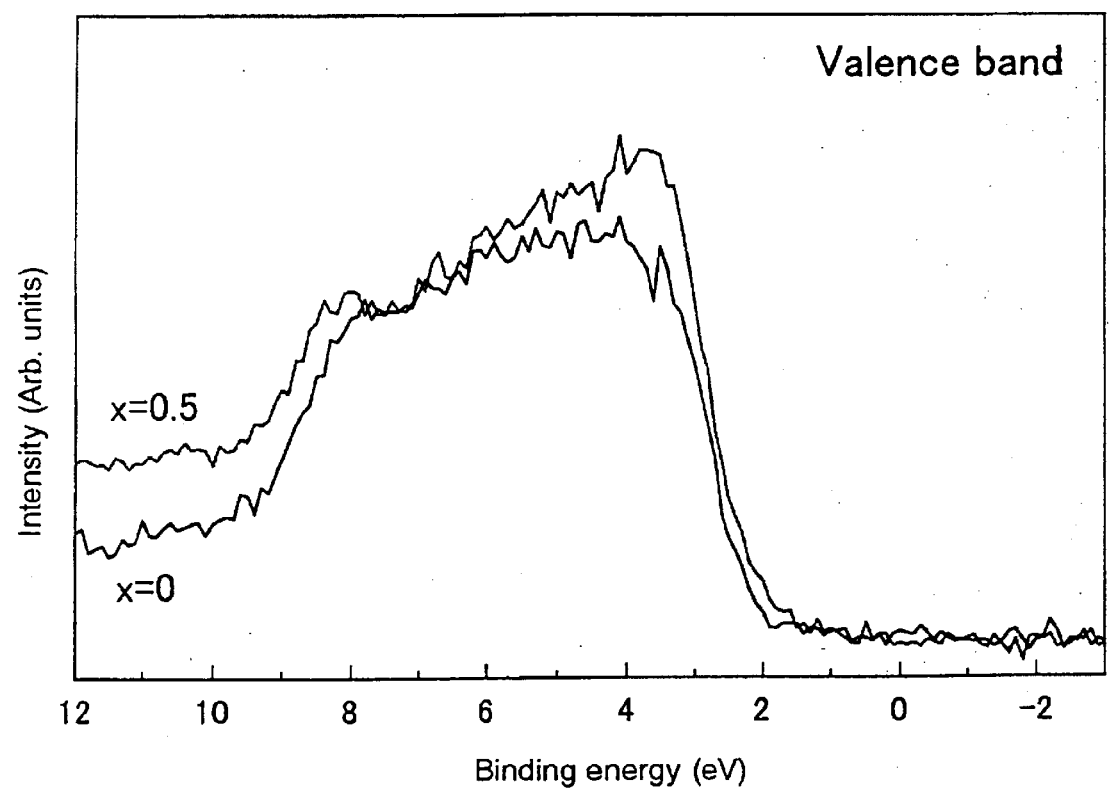

FIG. 18 indicates valence band electron spectra referring to $In_2O_3$:$Cu_x$ [x=0, 0.5 (CuO)].

Figure 19:
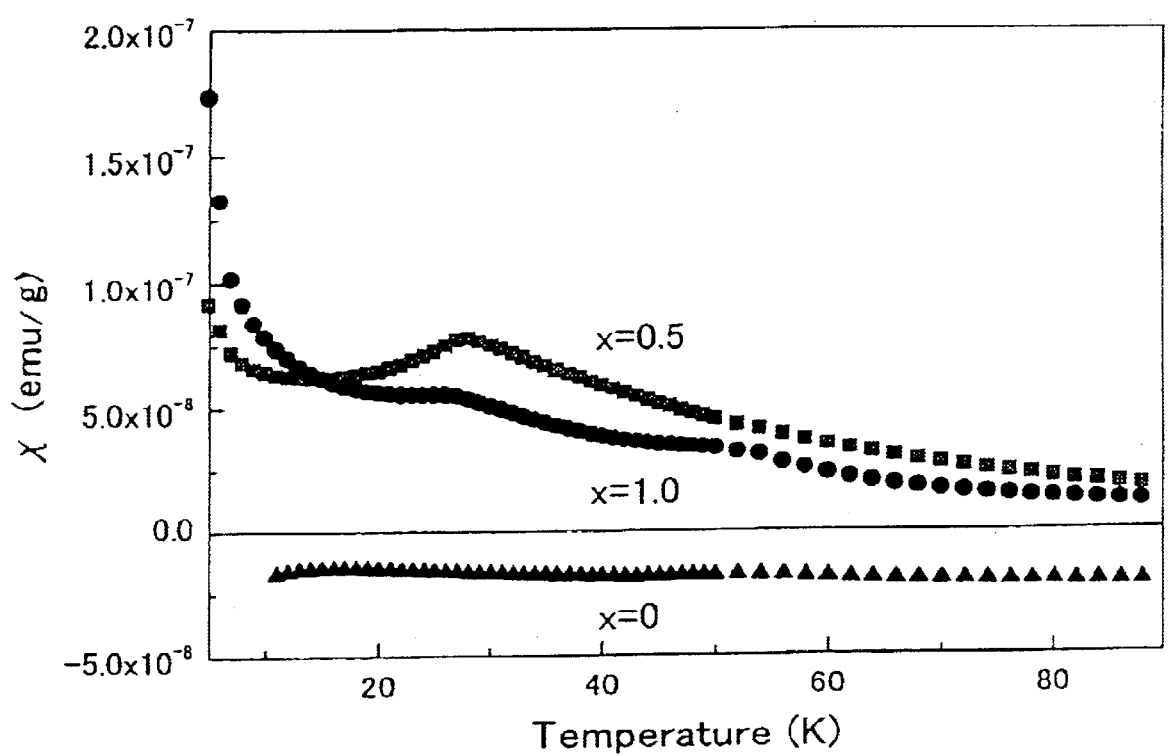

FIG. 19 indicates magnetic suceptibility-χ and dependence on the temperature (K) of $In_2O_3$:$Cu_x$ [x=0, 0.5, 1.0 (CuO)], and displays the magnetization feature having Neel temperature at the temperature nearby 28 K

THE BEST EMBODIMENT TO CARRY OUT THE INVENTION

The compound of the present invention will be readily illustrated according to the following description.

1. The crystalline Structure of $In_2O_3$ and Introducing of an Atom or an Ion Into Vacant Lattice Point of Said Crystalline Structure.

The crystal type of $In_2O_3$ is belonging to the Scandium oxide type.

The points occupied by atoms which compose crystal are shown in FIG. 9. 8a and 16c of $In_2O_3$ are the vacant points [for example, in FIG. 9, 8a points are indicated by big circle mark of ○ with oblique line (with shadow)]. To these points various kinds of atom or ion of said atom, for example $Li^+$ ion or $Cu^{2+}$ ion having smaller ion radius than $Li^+$ ion, can be introduced into with controlling position and concentration. In comparison with complete crystal, it become clear that the energy gap between valence electron band and electric conductive band reduces by the introduction of Li into either vacant points of $In_2O_3$. Further, it is confirmed that the compounds to which such kinds of ion are introduced have a varistor characteristic. While, it is confirmed that by introducing Cu, magnetic characteristic showing voluntarily magnetization is generated.

EXAMPLES

Example 1

Synthesis $In_2O_3:Li_x$ (x=0–1.0) compound, and the investigate the effect of Li introduction to $In_2O_3$.

1. Synthesis of Above Mentioned Compound $In_2Cl_3$ is dissolved into distilled water, introduce $Li^+$ (introduced as LiCl compound) so as molar ratio to be $[Li]/[In_2O_3]$=0–1.0 and stirred for 24 hours. After drying the solution, the obtained product is baked for one hour at 900° C. under the constant supply of oxygen gas.

The obtained powder product is observed by a scanning electron microscope (SEM), and the identification of the generation phase and the determination of lattice constant is carried out by an X-ray diffraction method.

Figure 3:
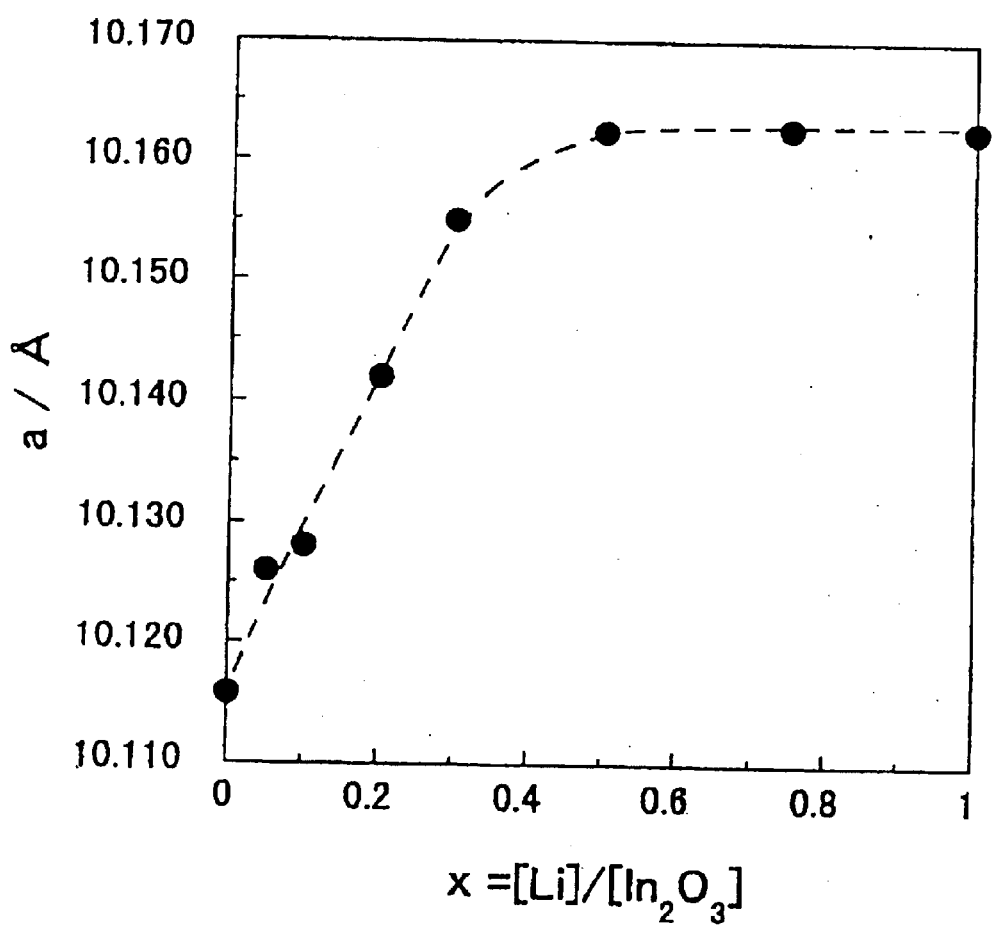
FIG. 3 shows the lattice constant of each specimens measured from plane lattice spacing.
Figure 4:
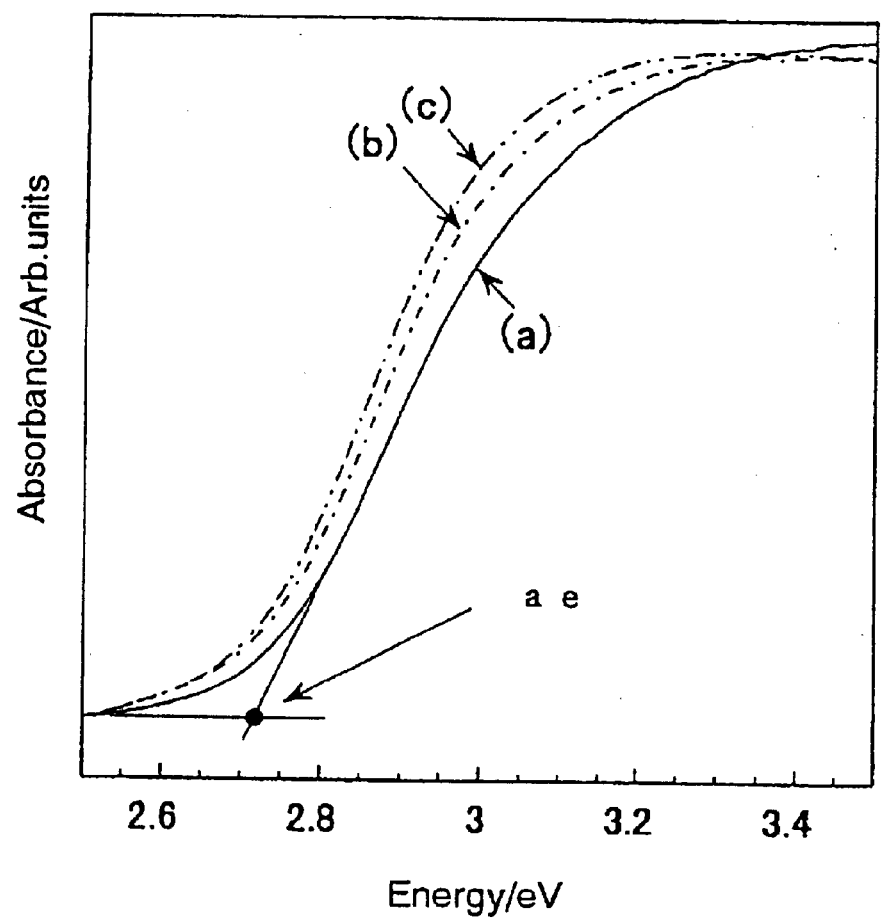
FIG. 4 shows the optical-absorption characteristics by diffuse reflectance spectrum of $In_2O_3$:$Li_x$ [x=0(a), 0.2(b), 1.0(c)], wherein, ae means optical absorption edge (corresponding to band gap).

The lattice constant of $In_2O_3$ cubic lattice is increased from 10.116 Å to 10.163 Å (FIG. 3), and the energy of photo absorbing edge is decreased from 2.72 eV to 2.68 eV (FIG. 4).

In the region of from x=0.5 to x=1.0, the lattice constant and the photo absorbing energy are constant (respectively, 10.163 Å and 2.68 eV).

According to the strong coupling approximation energy band calculation it becomes clear that the energy gap between valence electron band and electric conductive band reduces 0.2–1.1 eV by introduction of Li into 8a and 16c vacant points (refer FIGS. 13 to 15) of $In_2O_3$ crystal in comparison with a complete crystal (FIG. 6).

This fact indicates the reduction of the optical gap by introduction of Li. No change is observed in the inner shell electron restricting energy of $In_2O_3:Li_x$ (X=0, 0.2, 1.0). However, increasing of spectrum incidence covering wholly valence electron band range is recognized along with the increasing of introducing amount of Li, and the increasing is well coincided with the result of band calculation in a case when two Lis are introduced into vacant points of 8a or 16c (FIGS. 14 and 15).

The SEM observation images of $In_2O_3:Li_x$ [x=0(a), 0.2 (b), 0,5(c) and 1.0(d)] are shown from FIG. 1(a) to FIG. 1(d). In a case of X=0, fine particles having approximately 0.8 μm diameter are put together like a chain and from a wholly, view point, these particles are distributed without orientation. In a case of X=0.2, mixed particles of large diameter of approximately 1.5 μm and fine particles are observed. In a case of X is larger than 0.5, the particle diameter increased to 2 to 3 μm, and the shape of the particle is octahedron. The increasing of particle diameter along with the increase of Li introducing amount indicates that Li promotes the growth of particle.

Figure 1:
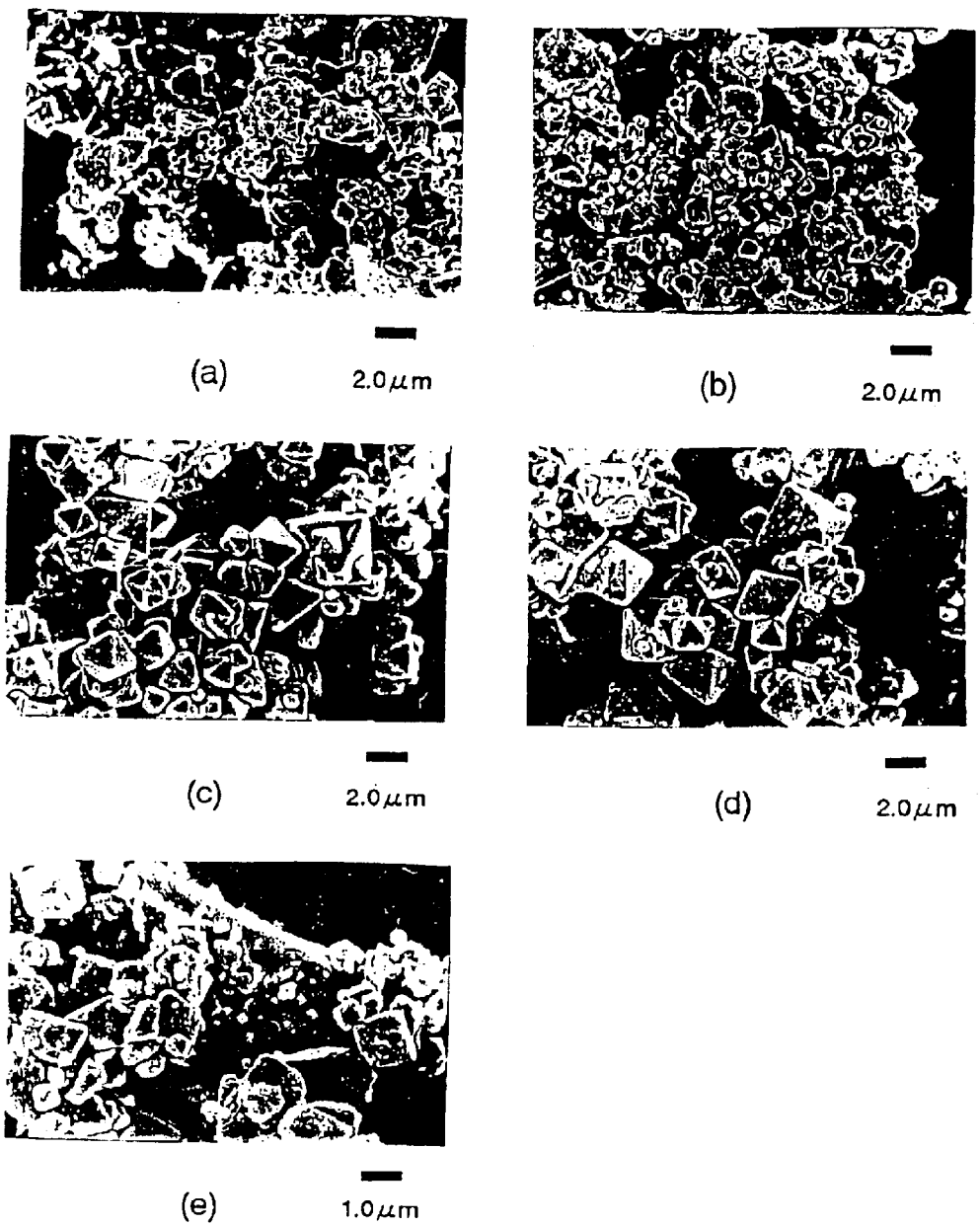

In FIG. 1(e), the growing process of octahedron is observed, and it is clearly understood from the picture that the fine particles are bonding together and forming octahedron. Li forms fusing layer on the surface and acts as the adhesive to combine particles so as the growth of particle proceed.

Crystalline Structure

Figure 2:
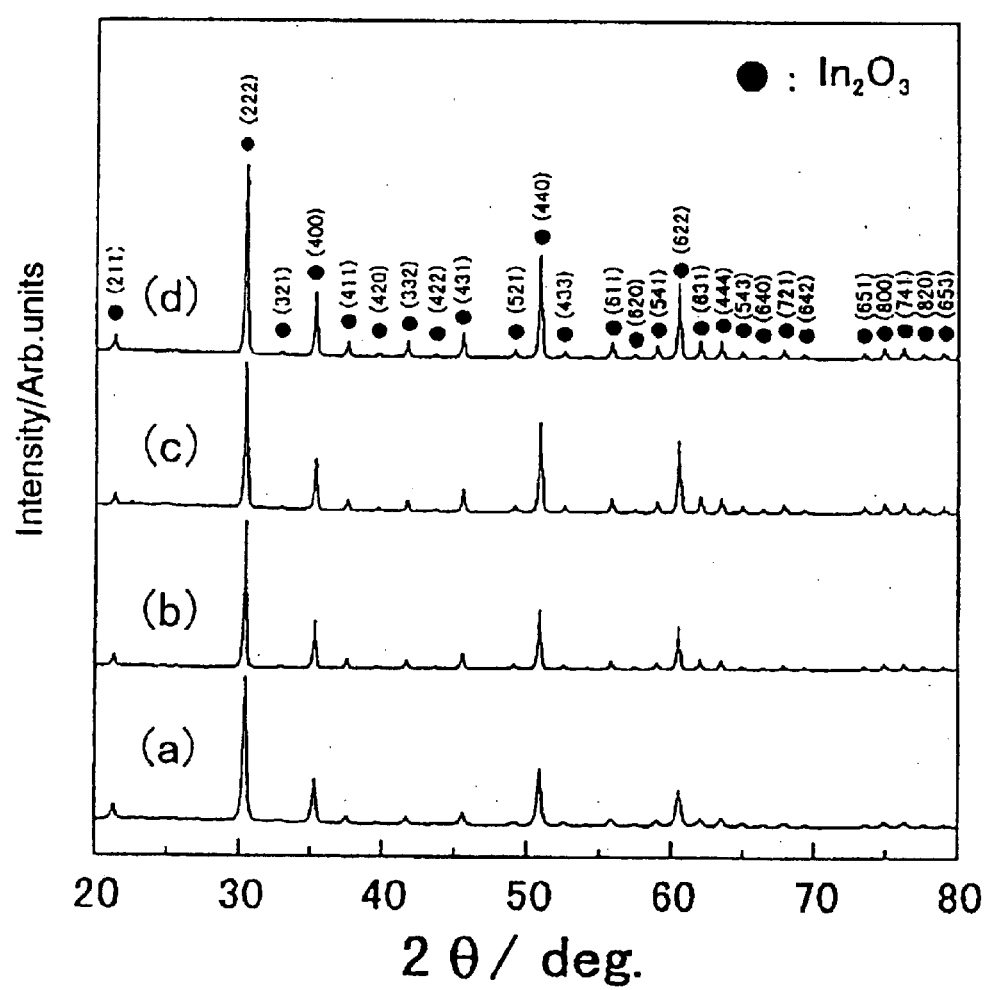
FIG. 2 shows X-ray refraction patterns referring to $In_2O_3$:$Li_x$ (x=0, 0.2, 0.5, 1.0).

X-ray diffraction patterns referring to $In_2O_3:Li_x$ (x=0, 0.2, 0.5, 1.0) are shown in FIG. 2. Along with the increase of x value, the diffraction peak is tending to shift to lower angle, and indicates that the plane lattice spacing expands by introduction of Li.

Also in a case of x=1.0, a new peak is not observed, and a different phase belonging to $Li_2O$ or $LiInO_2$ is not detected and only diffraction peak belonging to $In_2O_3$ is observed.

In FIG. 3, the lattice constant of each specimen calculated from the plane lattice spacing are shown. The lattice constant a=10.116 Å of $In_{2O3}:Li_x$ (x=0) is coincided with that of $In_2O_3$ [a=10.117 Å :M. Marezio, Acta Crystallogr., 20, 723(1966)] within an error in the computation. As far as x=0.3, lattice constant a increases linearly according to the increase of amount of Li introduction, and has a tendency to obey Vegard's law (the difference between lattice constant of solid solution, for example, $In_2O_3$:Li and lattice constant of solvent, for example, when $In_2O_3$ is pure is in proportion to the concentration of solute atom (Li).).

The space group of $In_2O_3$ crystal is Ia3, and a cubic unit lattice of C-rare earth type structure is composed of the combination of 8 unit lattices of fluorite structure from which an oxide ion is lacking (refer to FIG. 9). In a case of C-rare earth type structure, 8b point and 24d point are occupied by In and 48e point is occupied by O, further, 8a and 16c points are vacant. The ion radius of $Li^+$ is 0.90 Å and is very closed to the ion radius of $In^{3+}$:0.94 Å. Therefore, it is considered that Li is present in 8a or 16c point, and this prediction can be supported by the fact that the limit of solid solution of Li to $In_2O_3$ is nearby x=0.5. When $Li^+$ is introduced into 8a or 16c point, a surplus repulsing energy among cations generates with $In^{3+}$ having face-centered cubic arrangement and consequently the lattice constant extends.

When the amount of Li introduction is larger than 0.5, the lattice constant is saturated, therefore, it is considered that Li exists not only in a lattice but also in particles.

Optical Characteristics

Figure 5:
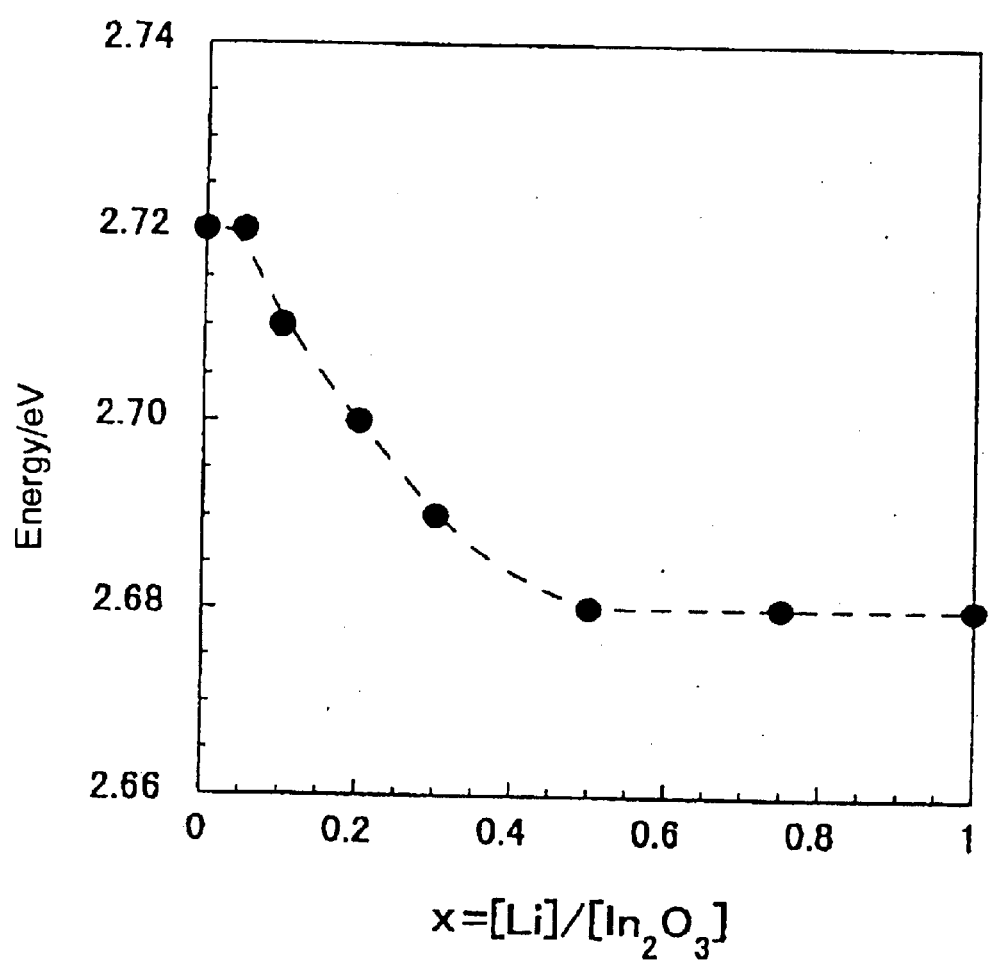
FIG. 5 shows the relationship between introducing amount and absorption edge.

The diffuse reflectance spectrums of $In_2O_3:Li_x$ (x=0, 0.2, 1.0) are shown in FIG. 4. The absorption edge of each specimen is approximately 2.7 eV, and the appearance is yellowish. This is caused by indirect transition among H point and ⌈ point and this value is corresponding to the experimental results by Weiher et al. As shown in FIG. 5, the absorption edge is red shifted according to the increase of amount of introduction and saturated at over than x=0.5.

Further, the inclination of absorption spectrum increased along with the introduction of Li. The reason why is considered to be concerned with the reduction of energy difference and the increase of density among states referring to the indirect transition.

Band Calculation

The calculation of energy band is carried out by introducing Li into 8a or 16c point and only considering the closest mutual effect. The electron state density of $In_2O_3$ complete crystal is shown in FIG. 6①, the full state density of $In_2O_3$ crystal to every points of which Li are introduced and partial state density of Li2s orbit are shown from FIG. 6② to FIG. 6⑤. For the preparation of each state density curves, Gauss function which has a half width of 0.2 eV is used. In a case of $In_2O_3$ complete crystal, In5s orbit forms the lower end of electric conductive band and O2p orbit forms the upper end of valence electron band. When Li is introduced into one point of 8a point (FIG. 13), and into two points of 8a, a state density generates at the lower end of electric conductive band or valence electron band as shown in FIG. 6④ and in FIG. 6③, which can not be observed in a case of complete crystal. When one Li is introduced, a new state density originated to Li2s antibonding orbital is formed at the lower end of the electric conductive band. And when two Li are introduced, a new state density appears covering whole field of valence electron band from the upper end of valence electron band. FIG. 6④ and FIG. 6⑤ show the state density of $In_2O_3$, when two Li are introduced into 16c point, and almost same tendency can be observed to the case when two Li are introduced into 8a point. When two Li are introduced into 16c point, compared with the case of coordination number is 3(Li—O) (d), the case of 6[(Li—O)×3, (Li—In)×3] (e), a new large state density is formed at the lower end of electric conductive band and the remarkable change can be observed at all state density.

The crystalline structure corresponding from ② to ⑤ are shown in FIGS. 13 to 15. If the energy difference between ★ and ★★ of ⑤ is smaller than 50 meV, dopant forms shallow rank, the valence electron band level and the bottom of electric conductive band are overlapped, then an electric charge carrier is inserted into vacant electric conductive band and indicates high electric conductivity. By containing second and third mutual action, the energy gap value becomes closer to that of experimental result. Both in cases of 8a point and 16c point, by the introduction of Li, the state density which cannot be observed in the case of complete crystal generates at the lower end of electric conductive band or at the valence electron band and indicates the tendency that the energy gap is reduced. This tendency indicates the reduction of energy gap by the introduction of Li. From the comparison of partial state density, it becomes clear that said tendency is caused by In—Li, namely, metal-metal mutual action rather than by Li— mutual action. In this case, the energy difference between donor level formed by dopant and the electric conductive band is 1.5 eV.

X-ray Photo-electron Spectrum

The In 3d, O 1s is inner shell spectra of $In_2O_3:Li_x$ (x=0, 0.2, 1.0) are shown in FIG. 7. Notwithstanding the increase of introducing amount of Li, the remarkable change of bound energy of In3d electron and O1s electron were not observed. The valence electron band spectrums of $In_2O_{3:Li_x}$ (x=0, 0.2, 1.0) are shown in FIG. 8. Along with the increase of introducing amount of Li, the spectrum intensity from about 1.0 to 8.5 eV is enlarged. This fact is coincided with the band. calculation result carried out by introducing two Li into 8a point or 16c vacant point (FIG. 14, FIG. 15).

Preparation of Uniform Thin Film $In_2O_3$ crystal prepared by carrying out introducing type introducing as mentioned above is, used as a target, and a thin film of said crystalline composition is formed on the substrate of silica glass by laser abrasion method. The voltage/current characteristic of the obtained thin film is measured, and it is confirmed that said thin film indicates varistor characteristic.

While, the thin film of said crystal can be prepared by conventional methods used for the formation of $In_2O_3$ thin film such as high frequency sputtering method, ion beam depositing method, electron beam evaporation method using an alloy of dopant specie and In as a starting material, resistance heating evaporation method and chemical vapor depositing (CVD) method using dopant specie, lower boiling point metal organic compound or halogenated compound of In as a starting material. Further, spin coat method using starting material by sol-gel method, dipping method that uses starting material mixed with organic compound having adequate viscosity, doctor blade method or printing method, which are the forming method of film not using vacuum, can be used.

Example 2

As the introducing component, Cu whose ion radius is smaller than that of Li of Example 1 is used, and the introducing and the characteristic of obtained product is observed.

From the X-ray diffraction pattern (FIG. 16), the change of lattice constant is not observed.

From the adsorption spectrum (FIG. 18), it is observed that the absorption edge and absorption peak are sifted to lower energy side. From the fact, introducing of Cu to $In_2O_3$ is confirmed.

The change of photo absorption spectrum reflects the change of state density classification at valence electron band and electric conductive band.

The temperature dependency of magnetizing rate by introducing of Cu, which is a transition metal is investigated. And it become clear that at x=0.5, by introduction of Cu, indicates antiferromagnetizm having Neel point at the temperature nearby 28 K.

Example 3

The effect of H introduction to ZnO is investigated.
1. Synthesis of Thin Film of Above Mentioned Compound and Introduction of H.

Since ZnO has hexagonal wurtzite type crystalline structure, one tetrahedral hole among neighbor tetrahedral holes is not satisfied, and is one of the suited substance to reinvestigate the effect of introducing type introducing indicated in Example 1.

In this Example, for the purpose to clarify the effect of introducing type, an insulate thin film of ZnO is previously prepared, then H is introduced to said thin film by an ion implantating method, which is regularly used for the introducing of impurity in the semiconductor manufacturing industry. The improvement of the electric conductive rate by implanting H ion numerical density can be explained as the effect of introducing of said implanted H atom, which becomes to be located at above mentioned vacant point. This can be explained that because said implanted H has the smallest radius among all elements and the substitution of Zn or O by H is impossible.

Substantial Condition:

A sintered ZnO target is used, an ZnO thin film of 2 μm thickness is deposited by an rf magnetron sputtering method.

For the purpose to obtain an insulate ZnO thin film (electric conductive rate is smaller than $10^{-7}$ S/cm), 20 vol % $O_2$ gas is introduced to Ar which is used as a sputtering gas. By carrying out the deposition without heating a substrate, the aimed insulate ZnO thin film can be obtained. The implantation of H ion into film can be carried out by accelerating $H^+$ ion to 100 kev and colliding with the thin film so as $H^+$ ion to insert into inside of the film. Make the amount of dose increase by increasing number of figures from $1 \times 10^{15}/cm^2$ to $1 \times 10^{16}/cm^2$ and to $1 \times 10^{17}/cm^2$.

The implanting of ion is carried out by maintaining the temperature of film at normal temperature to avoid the damage by irradiation which is impossible to restore. Further, it is surely necessary to carry out annealing after implantation, for the purpose to provide an electric activity.

In the case of introducing type of the present invention, the sufficient low specific resistance can be accomplished by lower temperature annealing at 200° C. in stead of annealing at the temperature of 400° C., which is necessary temperature condition for the conventional substitution type annealing. The reason why is illustrated as follows. That is, because a dopant exists at the interstitial point, and in the case of introducing type, the sufficient effect can be accomplished by smaller activation energy.

As shown in FIG. 10, the electric conductivity is remarkably improved by introducing larger than $1 \times 10^{16}/cm^2$ and by the dosing amount of $1 \times 10^{17}/cm^2$, the ten figures improvement of electric conductivity, namely the improvement from $1 \times 10^{-7}$ S/cm to $1 \times 10^3$ S/cm is observed. The carrier density measured at the same time is $1 \times 10^{21}/cm^3$, and in comparison with the numerical density of $4 \times 10^{22}/cm^3$ of ZnO crystal, it can be said that the introducing of 10% higher concentration is realized.

It is considered that this high activated rate is caused by the phenomenon mentioned below. That is, H which is introduced into interstitial point forms falsely O—H bond with the closest O in ZnO crystal and acts as a donor, and floats in interstitial point by very small activating energy. This can be easily understood from the results by secondary ion quantitative analysis to the depth direction (H concentration is high at the surface and is almost flat in the film. High concentration at the surface maybe caused by the problem of measuring) as shown in FIG. 11. When the activating energy of H is high and has a tendency to exist at a specific part, a peak of H concentration must be recognized at the center thickness of the film.

In the meanwhile, the thin film of said crystal can be prepared by conventional methods used for the formation of ZnO thin film such as high frequency sputtering method, ion beam depositing method, electron beam evaporation method using an alloy of dopant specie and In as a starting material, resistance heating evaporation method and chemical vapor depositing (CVD) method using dopant specie, lower boiling point metal organic compound or halogenated compound of In as a starting material. Further, spin coat method using starting material by sol-gel method, dipping method that uses starting material mixed with organic compound having adequate viscosity, doctor blade method or printing method, which are the forming method of film not using vacuum, can be used.

As the concrete examples, the cases for $In_2O_3$ crystal and ZnO crystal are shown, however, above mentioned method for crystal thin firm preparation can be used for the introduction of an atom and the ion thereof into vacant point of other crystal by slightly changing conditions. Further, in a case which uses besides Li, Cu, H or ions thereof as a material for introducing, above mentioned methods can be applied.

Further, the characteristics of obtained compounds can be changed variously by selecting the complete crystalline structure, by considering the introduction of introducing agent by the controlled concentration and/or to the controlled position of said crystal or by selecting a material for introducing.

The Possibility for the Industrial Use

As mentioned above, according to the present invention, the excellent action and effect that the compound having desired characteristics, for example, varistor characteristics, antiferromagnetizm or electric conductivity can be stable and voluntarily provided.

What is claimed is:

1. A compound prepared by introducing an element belonging to an alkali metal group or a transition metal group into a vacant lattice point of $In_2O_3$ crystal having $Sc_2O_3$ type translational symmetric crystalline structure.

* * * * *